Figure 1:
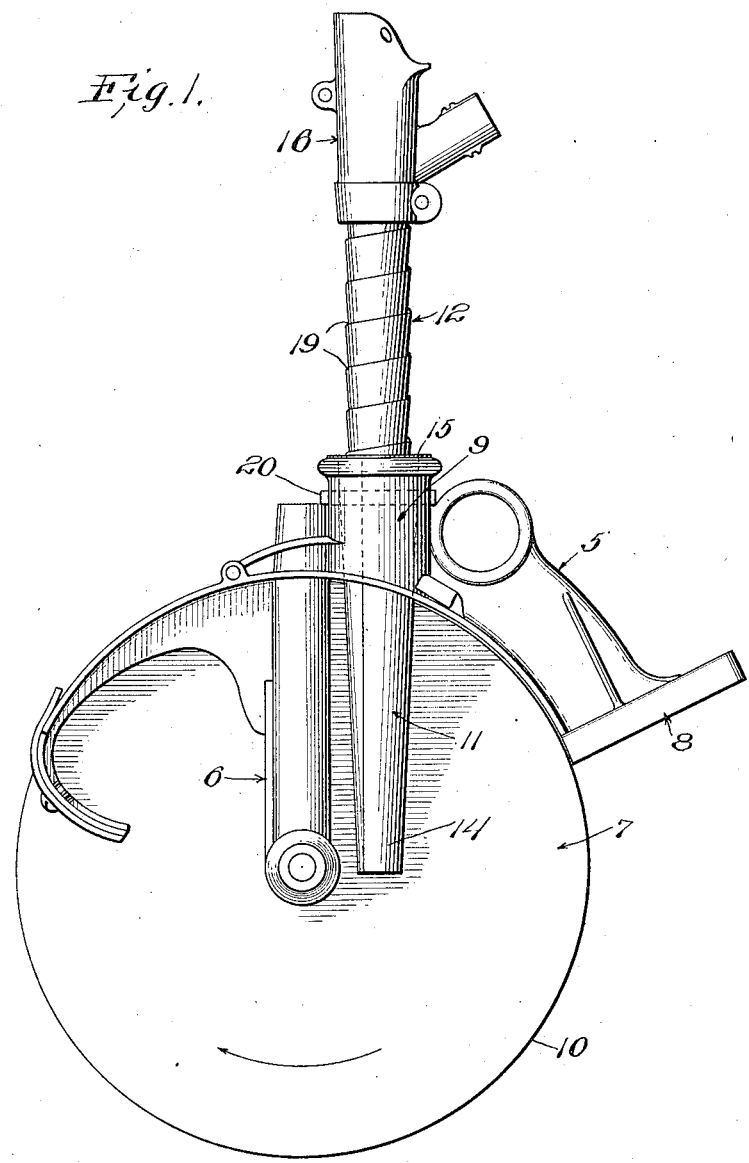

T. BRENNAN, Jr.
SPOUT FOR DISK ATTACHMENTS.
APPLICATION FILED NOV. 21, 1911.

1,036,436.

Patented Aug. 20, 1912.
2 SHEETS—SHEET 1.

Witnesses:

Inventor:
Thomas Brennan Jr.

T. BRENNAN, Jr.
SPOUT FOR DISK ATTACHMENTS.
APPLICATION FILED NOV. 21, 1911.
1,036,436.
Patented Aug. 20, 1912.
2 SHEETS—SHEET 2.
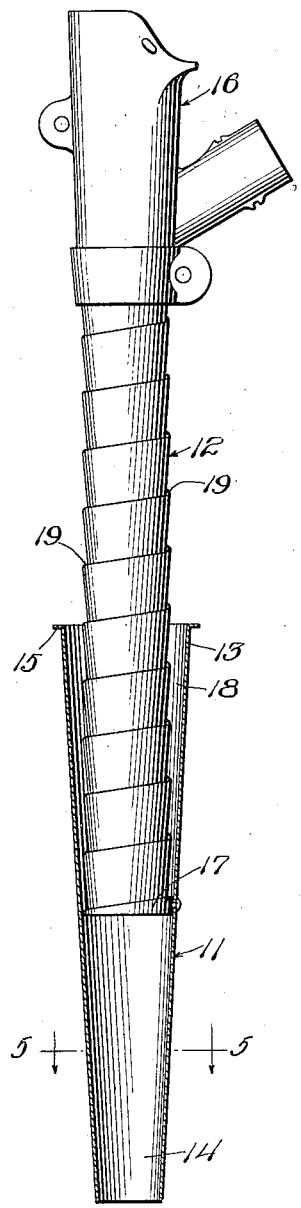
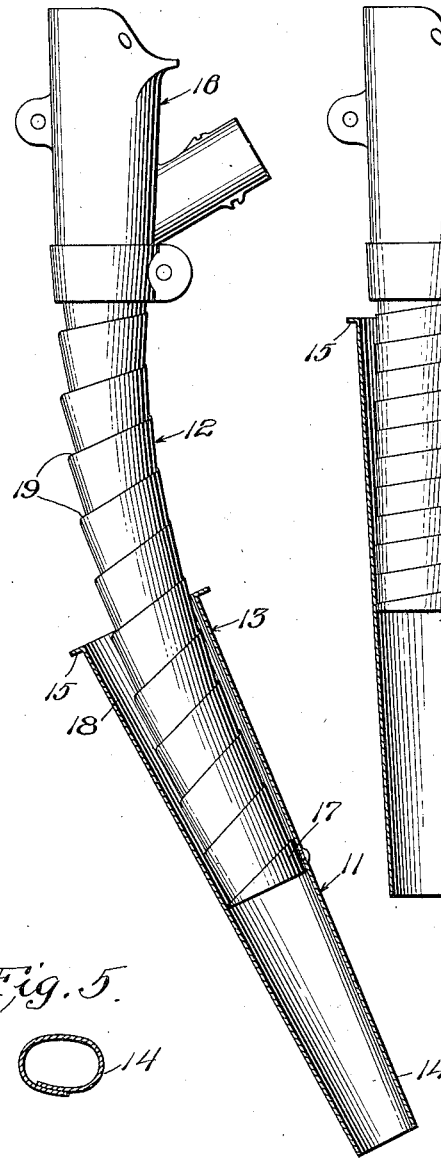
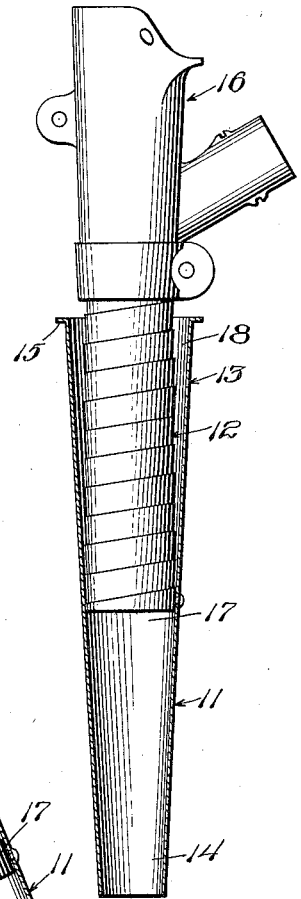
Witnesses:
Inventor:
Thomas Brennan Jr.
By
Attys.

UNITED STATES PATENT OFFICE.

THOMAS BRENNAN, JR., OF MINNEAPOLIS, MINNESOTA, ASSIGNOR TO THE MONITOR DRILL COMPANY, OF MINNEAPOLIS, MINNESOTA, A CORPORATION OF MINNESOTA.

SPOUT FOR DISK ATTACHMENTS.

1,036,436.

Specification of Letters Patent.

Patented Aug. 20, 1912.

Application filed November 21, 1911. Serial No. 661,519.

*To all whom it may concern:*

Be it known that I, THOMAS BRENNAN, Jr., a citizen of the United States, residing at Minneapolis, county of Hennepin, and State of Minnesota, have invented certain new and useful Improvements in Spouts for Disk Attachments, of which the following is a specification.

This invention relates to a new and improved spout for disk attachments, and to the manner of its combination with such an implement.

It is particularly intended to provide a spout for use in connection with double disk attachments, in which the grain or other matter is to be delivered down between the two disks as they open the furrow. It will presently appear, however, that the spout is in no wise limited to this particular use.

In the construction of grain drills, it is customary to provide a frame on which are carried one or more grain boxes or receptacles. Where a number of rows of grain are to be planted simultaneously, a disk attachment is provided and is carried by the frame for each of the rows. These disk attachments are individually attached to the frame in such a way that as the drill advances over the field, the several disk attachments can rise and fall individually, to accommodate themselves to irregularities in the surface of the ground. The frame of the drill moves in a practically uniform manner however, so that as the individual attachments rise and fall they approach toward and recede from the box or boxes containing the grain. For this reason, special means must be provided to insure a proper delivery of grain from the box to a point between the disks at all times.

It has been customary to provide a spout which extends from the grain box down through the boot of the disk attachment to a point between the disks. Such spouts have generally been flexible throughout their entire length, or when rigid in their lower portion they have been so carried by the boot that unsatisfactory operation has followed. It will be understood that the disks of a double disk attachment are placed at an angle to each other, and are held in contact in their forward lower portions. Therefore, they inclose between them a wedge-shaped space. The grain spout depends in the forward portion of this wedge-shaped space, where the disks are descending in their rotation. Of a consequence, whenever the lower portion of the spout is projected or forced forwardly or downwardly too far, there is danger that it will wedge between the disks as they are rotating, and will be firmly gripped by them. Whenever such wedging occurs, the spout is torn from the boot, or else the disks are blocked and refuse to rotate. In either case, the operation of the drill is impaired, and frequently the attachment itself is ruined. It is obvious that such accidents, as the above, are due to the fact that the lower end of the spout can be projected or forced forwardly or downwardly so far as to permit of the wedging. Now, under any circumstances the attachment will move up and down with respect to the grain box so special means must be adopted to remove the possibility of the wedging action.

One of the main objects of this invention is to provide a spout which shall overcome the difficulty above mentioned.

Now the customary grain drill construction is one in which each attachment swings about a given center as it rises and falls. Therefore, the angle between the spout and the boot must change as the attachment rises and falls, or else the spout itself must be of such a nature that it may bend or flex to compensate for such change of angle. In the next place as the attachment rises and falls it approaches toward and recedes from the grain box. Therefore, the spout must be of a nature to accommodate its length to the exact position of the attachment. Now it has been previously shown that, if the lower end of the spout is permitted, or is caused to move forwardly or downwardly too far, it will become wedged between the disks. Certain forms of spout heretofore used have been rigid throughout their length and free to rise and fall between extreme limits. Therefore, as the attachments rose and fell the lower end of the spout would be forced forwardly on account of the change of angle of the attachment, and the spout would be forced too far downwardly between the disks, to wedge between the disks in case of extreme oscillations.

One of the objects of my invention is to overcome this difficulty by providing a spout, the lower end of which shall be rigid, but so supported in the boot that it cannot possibly deflect so far forward, nor be forced downward so far as to wedge between the disks. At the same time the spout of the present invention is so constructed that it can accommodate itself to changes of angle due to the rise and fall of the attachment about the given center.

Another object of the invention is to provide a spout which shall permit of extreme movements of the disk attachment without jamming, the ordinary movement of the attachment occurring while the lower portion of the spout maintains a fixed relation with respect to the boot and disks.

Another object of the invention is to provide a spout which can be cheaply and conveniently made from pressed metal, thereby permitting of a reduction in cost of manufacture as well as insuring a light but stiff construction.

A further object of the invention is to provide a spout which can be used in combination with any one of a number of forms of disk attachments as at present constructed, although the spout is shown as used in connection with a particular form of attachment.

Other objects and uses will appear from a detailed description of the invention which consists in the features of construction and combination of parts hereinafter described and claimed.

In the drawings, Figure 1 shows a side view of one form of disk attachment with which my improved spout may be associated, the spout being shown in its normal position, and the near disk being removed from the attachment; Fig. 2 shows an enlarged detail of the spout in its normal condition, the lower rigid portion being shown in section; Fig. 3 shows a view similar to Fig. 2, the lower rigid portion being deflected to one side to show the manner in which the upper flexible portion can accommodate itself to such deflection; Fig. 4 shows a view similar to Fig. 1, the lower rigid portion of the spout being forced upwardly to collapse the upper flexible portion; and Fig. 5 is a section taken on line 5—5 of Fig. 2.

In the drawings, the boot of a disk attachment is designated by the numeral 5. It is provided with a standard 6 carrying disks 7, and a drawbar connection 8. As the attachment advances, the disks rotate in the direction indicated by the arrow. In its upper portion, the boot is provided with the customary neck 9 through which the spout is extended, and depends between the disks and in advance of the standard 6.

It will be understood that the disks come together at some point 10 in their lower forward portion, and that the distance between them increases rearwardly so that a wedge-like space is inclosed between them.

Now under ordinary circumstances, the lower portion of the spout might be deflected over into the forward portion of this wedge-like space, or be lowered too far into it, there to be caught by the disks in their downward rotation. The spout of the present invention comprises a lower rigid member 11 and the upper flexible member 12. The member 11 may be made from pressed steel or other suitable material, preferably tapering in diameter from its upper portion 13 to its lower portion 14, and being provided with the outwardly extending flange 15 in its upper end, such flange being adapted to lie on the top of, or engage the neck 9 of the boot. Owing to the depth of the neck 9 measured in a vertical direction, the lower member 11 cannot deflect forward to any material extent, and therefore cannot reach over into the extremely narrow portion of the wedge between the disks. Also the flange 15, or other equivalent device, limits the extent to which the spout member may fall in its downward movement.

The member 16 is adapted to be attached to the grain box, and consequently must move with respect to the attachment. To permit of this result, the member 12 is flexible. It comprises a twisted ribbon of flexible steel, or other suitable material, the normal shape of which is shown in Fig. 2, but which ribbon may be deflected, as shown in Fig. 3, or may be compressed, as shown in Fig. 4. Now the lower end of this ribbon is rigidly attached to the member 11 at the point 17. This point is at such a distance below the flange 15 that practically the entire flexible member can be compressed into the space 18, as shown in Fig. 4, thus permitting the lower rigid portion of the spout to be forced upwardly an extreme amount, as shown in Fig. 4. Such an extreme movement could not take place unless the successive convolutions of the ribbon had a sufficient space 19 between them to permit the successive convolutions to telescope within each other, and it could not take place unless the lower end of the flexible member were supported so far down in the rigid member that a sufficient length or distance would be provided to receive the flexible member when its convolutions had been telescoped. It will be understood also that the spaces 19 between the successive convolutions of the flexible member permit the same to be twisted or deflected, as shown in Fig. 3.

It will be seen that by the combination of the rigid lower member with the flexible upper member, the former may be carried by the boot in such way that it will not be deflected to one side a sufficient amount to wedge between the disks, notwithstanding that the attachment considered as a whole will be deflected with respect to the grain box. In other words, that portion of the spout which lies between the disks cannot be deflected forward to any material extent, although it can rise and fall according to the movements of the disk attachment.

It will be understood that, as the disk attachment falls from the position shown in Fig. 1 into the dotted line position 20, the rigid member 11 will simply depend from the flexible member 12. In case the disk attachment should rise from the position shown in Fig. 1, the result would be to compress the flexible portion, as shown in Fig. 4. In either case, however, the lower rigid member cannot be deflected forward, and consequently any danger of its becoming wedged between the disks is obviated.

It is seen from the above that, by forming the lower portion of the spout comparatively rigid, and by supporting it in the boot in such manner that it cannot be deflected forwardly, the danger of the lower end being thrown forwardly so far as to wedge between the disks is obviated. Furthermore, by limiting the extent to which the lower portion of the spout can fall between the disks, the danger of wedging is further removed. Then by the provision of the flexible upper portion of the spout, the movements of the disk attachment, and its changes of angle, are compensated for. Furthermore, by carrying the flexible upper member down a considerable distance into the lower rigid member, the former may be compressed a much greater amount than would otherwise be possible. Thus, the spout can accommodate itself to greater movements of the attachment than would otherwise be possible.

While I have shown and described my improved spout as used in connection with a double disk attachment, it is obvious that its use is not necessarily restricted to double disk attachments, but might be extended to any form of agricultural, or similar implement, where it could be of service. It is true, however, that this spout is peculiarly adapted for use in connection with double disk attachments.

I do not limit myself to the form of construction herein shown and described, except as called for by the claims, but I contemplate within the scope of my invention any form of spout having a lower rigid portion, an upper flexible portion, or one in which the lower portion is caused to move in a substantially vertical manner with respect to the disk attachment, and which lower portion is prevented from falling more than a predetermined distance downward between the disks.

I claim:

1. A spout for disk attachments comprising a lower tubular member and an upper flexible compressible member having its lower end entered into the tubular member and secured to the same at substantially the central portion of the tubular member, the flexible compressible member comprising a spiral band of resilient material having each convolution thereof of lesser diameter in its lower portion than in its upper portion and having the lower portion of each convolution surrounded by the upper portion of the convolution immediately below, whereby the compressible member may be collapsed to bring its upper end substantially in line with the upper end of the tubular member, substantially as described.

2. A spout for disk attachments comprising a lower tubular member having the upper end thereof flanged outwardly and an upper flexible compressible member having its lower end entered into the tubular member and comprising a band of resilient material of spiral formation and having the lower portion of each convolution of the spiral surrounded by the upper portion of the convolution immediately below, and a rigid attachment between the lower end of the flexible compressible member and the central portion of the tubular member, substantially as described.

3. In a disk attachment, the combination of a boot, a pair of converging disks rotatably carried by the same and having a point of contact in advance of and below their point of support, a rigid tubular member slidably mounted within the boot and projecting into the space between the disks in advance of their point of support, and an upper flexible compressible member having its lower end entered within the rigid tubular member and secured to the same at approximately its mid-portion, substantially as described.

4. In a disk attachment, the combination of a boot, a pair of converging disks carried by the same and having their edges in contact in advance of and below their point of support, a rigid tubular member slidably mounted within the boot and having its lower end projecting into the space between the disks in advance of their point of support, and an upper flexible compressible member having its lower end entered within the rigid tubular member and comprising a spiral band of resilient material having the lower portion of each convolution of the spiral surrounded by the upper portion of the convolution immediately below, and an attachment between the lower end of said flexible compressible member and the central portion of the rigid tubular member, substantially as described.

5. In a disk attachment, the combination of a boot, a pair of disks carried by the same and having their edges in contact at a point in advance of and below their point of support, a rigid tubular member slidably mounted in the boot and projecting into the space between the disks in advance of their point of support, a flange on the upper end of said rigid tubular member for limiting its downward movement, and a flexible compressible member having its lower end entered in the tubular member and secured to the same at approximately its mid-point, substantially as described.

6. In a disk attachment, the combination of a boot having a spout perforation downwardly extending through its upper portion, a pair of disks rotatably carried by the boot and having their edges in contact in advance of and below their point of support, a rigid tubular member extended through the perforation of the boot and adapted to be guided thereby in its movements in a substantially vertical direction, means for limiting the downward movement of the tubular member, and a flexible compressible member entered into the tubular member and having its lower end secured to the same at approximately its mid-point, substantially as described.

THOMAS BRENNAN, Jr.

Witnesses:
E. R. BRENNAN,
ELEANOR MOSELEY.

Copies of this patent may be obtained for five cents each, by addressing the "Commissioner of Patents, Washington, D. C."